United States Patent [19]

Pattison

[11] Patent Number: 4,627,154
[45] Date of Patent: Dec. 9, 1986

[54] CELL JACKETING

[75] Inventor: Timothy A. Pattison, Lilburn, Ga.

[73] Assignee: Duracell Inc., Bethel, Conn.

[21] Appl. No.: 771,914

[22] Filed: Sep. 3, 1985

[51] Int. Cl.[4] .............................. H01M 2/02
[52] U.S. Cl. .................. 29/623.1; 429/167;
53/442; 156/86; 264/342 R
[58] Field of Search ............. 429/167, 206, 224, 229,
429/163, 176; 29/623.1; 53/442; 156/86;
264/342 R

[56] References Cited

U.S. PATENT DOCUMENTS 1,205,392 11/1916 Rhoades ........................ 429/167
2,595,963 5/1952 Lewis et al. ..................... 429/167
3,630,783 12/1971 Przybyla ....................... 429/167 X
3,869,314 3/1975 Gillespie ......................... 429/86
4,436,777 3/1984 Karpiloff ....................... 429/167 X
4,511,416 4/1985 Karpiloff ....................... 429/176 X Primary Examiner—Anthony Skapars
Attorney, Agent, or Firm—Ronald S. Cornell

[57] ABSTRACT

Electrochemical cells jacketed with a decorative heat shrink jacket are pre-heated to a temperature sufficient to soften the heat shrink jacket when placed thereon but below a temperature which will rapidly heat shrink the jacket. The heat shrink jacket is thereafter conformed to the cell by heat shrinking with distortion of the decoration thereon being minimized.

13 Claims, 1 Drawing Figure

U.S. Patent　　　Dec. 9, 1986　　　4,627,154
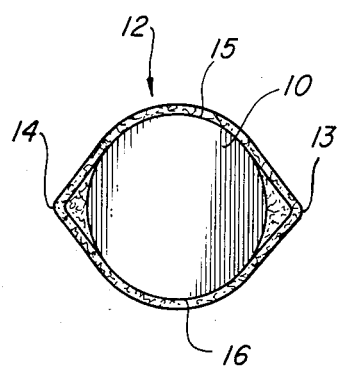

CELL JACKETING

This invention relates to electrochemical cells which are jacketed with heat shrink materials, particularly those having decorations thereon.

An increasingly common procedure in the commercial preparation of electrochemical cells is the jacketing thereof with heat shrink material. In such procedure a heat sensitive tubing of predetermined length is placed around the electrochemical cell container (usually of a metallic material) and the tubing is heated until it shrinks to a snug wrapper for the cell. Such wrapper or jacket is either a clear insulative coating for the cell or more commonly is a decorative outer container for the cell. It has however been discovered that during the heat shrinking procedure there is a tendency for uneven shrinkage to occur with distortion of color and graphics. This is particularly prevalent with tubing which is normally stored flat and opened in order to sleeve the cell. In such configuration the tube is partially in contact with the generally cylindrical metal cell container and spaced from the cell container at the crease lines. As a result, the metal cell container itself acts as a heat sink, at the points of contact between the container and the tube, thereby drawing away some of the heat from the tube while the portion of the tube not in contact with the container receives a full measure of the heat. Uneven shrinkage occurs with the aforementioned detrimental distortion of colors and graphics.

It is an object of the present invention to provide a means for preventing such uneven shrinkage and distortion particularly in a manner conducive to high speed production line manufacturing.

This and other objects, features and advantages of the present invention will become more evident from the following discussion and drawing in which the sole FIGURE is an end view of a cylindrical cell placed in an opened heat shrink tube.

Generally the present invention comprises a method for uniform heat shrink jacketing of electrochemical cells without substantial i.e. perceptible distortion of decorations on the jacketing material. In order to ensure uniformity of the heat shrinking in accordance with the present invention, the metal cell can or container itself is pre-heated, preferably before sleeving, to a temperature for a period of time sufficient to soften the heat shrink jacket when placed thereon but below a temperature which will rapidly heat shrink the jacket. The softening temperature is defined herein as a temperature at which the heat shrink material loses its crisp definition, i.e. the normally planar surface of the material becomes wavery and the crease lines of an opened, initially flat tubing become rounded. At such temperature the material will shrink over a long period of time of about two to three hours. The rapid heat shrink temperature is defined herein as being the temperature at which the heat shrink material begins to rapidly shrink whereby proper positioning of the cell can, relative thereto is precluded because of such immediate shrinkage.

After heat stabilization between the heat shrink material and the cell can, the heat shrink jacket is conformed to the cell by rapid heat shrinking with distortion of the decoration thereon being minimized. The heat sink effect of the metal cell can is thereby negated and the heat shrink jacket is conformed to the cell by heat shrinking with distortion of the decoration thereon being minimized.

The temperature to which the cell container is actually heated is higher than the softening temperature of the heat shrink material but is adjusted, on the basis of heat transfer parameters; e.g. heat exposure time between the metal cell can and the heat shrink material, material thickness of both the cell can and the jacket, heat dissipation during the time between the can pre-heating and the initial cell can jacketing, heat conductivity characteristics of the jacket material, etc.; to provide the tube at the point of contact of the cell can, with the requisite softening temperature. Reference hereinafter to "softening temperature" is to the temperature to which the cell can or container is heated whereby, after heat transfer to the jacket, the temperature which such jacket actually sees is its softening temperature. Similarly the maximum temperature to which the cell container is heated is adjusted to directly provide the heat shrink jacket material with a temperature below the rapid heat shrink temperature of the particular heat shrink material being utilized.

Pre-heating of the cell to a temperature below the softening temperature is generally ineffective in preventing the heat sinking effect exerted by the cell with concomitant decorated heat shrink jacket distortion. Pre-heating to a temperature at or above the rapid heat shrink temperature will generally preclude proper placement of the heat shrink jacket on the cell since the jacket will immediately shrink when initially placed into contact with the cell.

As illustrated in the drawing a cell can 10 is shown as being inserted within heat shrink tube 12 which has been opened from a flat stock. With such opening of tube 12 crease lines 13 and 14 remain and are spaced from contact with cell can 10. Cell can 10 is however in direct contact with the flat areas 15 and 16 which are heat sinked by the cell can 10 whereas the remainder of the tube is not. Accordingly during heat shrinking there is uneven heating of the tube and distortion thereof. The dotted lines indicate the conformation of the tube during the pre-heating of the cell can to negate the heat sink effects. The crease lines 13 and 14 lose their sharpness and the surface of the tube becomes soft and wavery. Heat shrinking thereafter is more uniform and distortion is substantially prevented.

The pre-heating of the cell is of particular utility with laminated multiple layers of decorated heat shrink materials such as described in copending application Ser. No. 709,276 filed Mar. 7, 1985 (assigned to the same assignee as the present invention), because of the susceptibility of such multiple layers to become wrinkled or distorted. However the present invention is equally applicable to single layer heat shrink materials when such materials are shrunk directly onto the cell.

Thicknesses of such heat shrink materials range from about 20 to 85 microns with the thickness of the material and the composition with its heat conduction characteristics being determinative of the degree of pre-heating. A preferred range of heat shrink jacket thickness is about 60-70 microns to ensure a pinhole free jacket of a minimal thickness.

A preferred heat shrink material is a non-plasticized polyvinyl chloride (PVC) resin with heat stabilizers and an impact modifier such as dioctyl phthalate added thereto. Other heat shrink materials include other forms of PVC, polystyrene, polyethylene, polyester and polyvinyl alcohol.

With respect to the preferred PVC heat shrink material described above with the preferred material thickness of about 70 microns, the softening temperature is about 35° C. and the rapid heat shrink temperature is about 52° C.

In order to more clearly illustrate the operation of the present invention the following example is presented. It is understood however that such example is illustrative in nature and details contained therein are not to be construed as being limitations on the present invention.

EXAMPLE

Alkaline (zinc anode, $MnO_2$ cathode and KOH electrolyte) "C" and "D" size cells with 10 mil (0.254 mm) thick nickel plated cold rolled steel cans are pre-heated by being passed through a heat tunnel set at a temperature between 250° to 350° C. for a period of time sufficient to allow the cells to reach a temperature between 50° to 70° C. A decorated heat shrink tube formed from flat stock tubing of two 35 micron layers of modified PVC (non-plasticized polyvinyl chloride (PVC) resin with heat stabilizers and an impact modifier of dioctyl phthalate added thereto), cut to size and opened, is placed and properly positioned on each of the cell cans and allowed to stabilize (15 and 30 seconds for cells pre-heated to temperatures of 70° and 50° C. respectively) whereby the heat shrink tube begins to soften. The cells are then passed through a heat shrink tunnel on a rolling insulated layer while being rotated at 100–200 rpm. The heat shrink tunnel has multiple heating zones (8 zones ranging between 70° to 200° C.) with the cells remaining in such tunnel for a period of time between 30–35 seconds. The cells emerge from the heat shrink tunnel decoratively jacketed with substantially no distortion of the decorative jacket. Because of the smaller size of "AA" size cells such cells are similarly decoratively jacketed but with the pre-heating tunnel being at a temperature of between 150°–200° C. and the heat shrink tunnel having 6 rather than 8 heating zones.

In an alternative embodiment the cell containers are initially jacketed and then pre-heated with the jackets thereon. In such embodiment the cell containers are preferably heated by direct conduction rather than by being passed through a heat tunnel and the pre-heating temperature is preferably very close to the rapid heat shrink temperature since there is no substantial problem with jacket positioning and orientation.

Though the present invention is specifically directed toward the jacketing of metallic cell containers since metallic heat conduction provides the greatest problems, it is also applicable to cells having containers made of other materials such as plastic with similar problems of decorative jacket distortion.

It is understood that the above example and description as illustrative of the present invention and that changes may be made with respect to material composition and dimension and temperature and time parameters and the like without departing from the scope of the present invention as defined in the following claims.

What is claimed is:

1. A method for uniform heat shrink jacketing of an electrochemical cell container, with a heat shrink jacketing material, with reduced distortion of said jacketing material upon heat shrinking, characterized in that said method comprises the steps of heating said cell container to a temperature for a period of time sufficient to soften the heat shrink jacketing material when positioned thereon but below a temperature which will rapidly heat shrink the jacketing material, positioning said jacketing material on said cell container, permitting the jacketing material and the cell container to heat stabilize, and thereafter rapidly heat shrinking said jacketing material onto said cell container.

2. The method of claim 1 wherein said cell container is comprised of a heat conductive metal.

3. The method of claim 2 wherein said heat shrink jacketing material is comprised of a sized segment of flat tubing which is opened for sleeving onto said cell container and wherein said cell container is cylindrical, with said cell container being in partial contact with the inner walls of said tubing prior to said rapid heat shrinking.

4. The method of claim 3 wherein said heat shrink jacketing material is comprised of a material selected from the group consisting of non-plasticized polyvinyl chloride (PVC) resin with heat stabilizers and an impact modifier added thereto, PVC, polystyrene, polyethylene, polyester and polyvinyl alcohol.

5. The method of claim 4 wherein said heat shrink jacketing material is comprised of non-plasticized polyvinyl chloride (PVC) resin with heat stabilizers and an impact modifier added thereto.

6. The method of claim 5 wherein said heat shrink jacketing material has a thickness between 20 to 85 microns.

7. The method of claim 6 wherein said heat shrink jacketing material has a thickness between 60–70 microns.

8. The method of claim 7 wherein said heat shrink jacketing material is comprised of two layers.

9. The method of claim 6 wherein said cell container is heated to a temperature for a time sufficient to heat said jacketing material to a temperature between 35° C. and 52° C.

10. The method of claim 9 wherein said cell container is comprised of nickel plated cold rolled steel and is heated to a temperature between 50° C. and 70° C. and said jacketing material is positioned thereon for a period of time between 30 and 15 seconds respectively prior to said rapid heat shrinking.

11. The method of claim 10 wherein said jacketing material is heated for at least 30 seconds to rapidly heat shrink said jacketing material onto said cell container.

12. The method of claim 3 wherein cell container is sleeved with said tubing prior to said heating of said cell container and said cell container is heated by direct heat conduction.

13. An electrochemical cell having a zinc anode, manganese dioxide cathode, an alkaline electrolyte and a cell container decoratively jacketed in accordance with the method of claim 3.

* * * * *